United States Patent [19]
Bernabeu-Auban et al.

[11] Patent Number: 5,805,572
[45] Date of Patent: Sep. 8, 1998

[54] SINGLE-SYSTEM IMAGE NETWORK SUBSYSTEM IN A CLUSTERED SYSTEM

[75] Inventors: Jose M. Bernabeu-Auban, Valencia, Spain; Yousef A. Khalidi, Cupertino, Calif.; Vladimir Matena, Redwood City, Calif.; Kenneth W. Shirriff, Mountain View, Calif.

[73] Assignee: Sun Microsystems, Inc., Mountain View, Calif.

[21] Appl. No.: 561,791

[22] Filed: Nov. 22, 1995

[51] Int. Cl.⁶ ...................................................... H04L 12/66
[52] U.S. Cl. .......................... 370/255; 370/257; 370/402; 395/200.5
[58] Field of Search ...................... 370/255–258, 370/401–405; 395/200.43, 200.47, 200.5, 200.79

[56] References Cited

U.S. PATENT DOCUMENTS 5,623,490  4/1997  Richter et al. ............................ 370/412

*Primary Examiner*—Melvin Marcelo
*Attorney, Agent, or Firm*—Blakely Sokoloff Taylor & Zafman

[57] ABSTRACT

Transparent routing within the cluster is achieved (without changing the networking code on each node of the cluster) by using a pair of modules interposed appropriately on the networking stack. In a "clustered" system built out of several computers, using the present invention, the networking subsystem appears to applications as if the applications are running on a single computer. In addition, no modifications to the networking code is needed. The present invention is extensible to a variety of networking protocols, not just TCP/IP as the packet filter allows the routing within the cluster to be done dynamically. No modifications to the applications is needed (same binaries will work). A packet filter and remote communication between the modules through IDL enable the modules to do their job. A name server that maintains the port name space is used.

16 Claims, 6 Drawing Sheets

SINGLE-SYSTEM IMAGE NETWORK SUBSYSTEM IN A CLUSTERED SYSTEM

BACKGROUND OF THE INVENTION

1. Field of the Invention

The present invention relates to the field of computer systems. More specifically, the present invention relates to providing a single system image of a networking subsystem as seen by applications in a cluster of computers.

2. Art Background

A multi-computer (cluster) operating system (OS) is an extension of a traditional OS that is used to control a collection (cluster) of computers. A multi-computer OS provides to a cluster of computers the same application interfaces (ABI/API), the look-and-feel, and administrative model of a traditional OS. A multi-computer OS is desired because hardware trends favor building multi-computer systems in the future. High speed low-latency networking enables the assembly of multi-computer systems. Furthermore, an economy of scale can be realized by building multi-computers out of "off the shelf" components. Moreover, multi-computer systems are readily expandable.

It is further desirable to extend existing operating systems to provide support for multi-computers. Such a system will provide the same ABI/API as current systems. In addition, such a system will require a minimal "learning curve" for system administrators. Multi-computers of the not too distant future will be built using non-uniform memory architectures and will scale to a larger number of CPUs. Multi-threading and SMP (Symmetric Multi-Processing) techniques that are employed to scale the OS on current symmetric uniform-memory multiprocessors will not work on future multi-computers with a large number of CPUs connected through a non-uniform memory architecture.

Networking is a large and complex part of modern operating systems. It is made complex, among other things, by the existence of mutually incompatible families of network protocols. The Internet protocol suite, which includes the TCP (Transmission Control Protocol), UDP (User Datagram Protocol) and IP (Internet Protocol) protocols and commonly referred to as TCP/IP, is an example of a widely used networking family today.

In a multi-computer system, it is unlikely that all nodes will have network devices. Even in configurations where each node does have a network device, it is unlikely that the network topology will offer connectivity to the same sub-network(s) from each node. Therefore, the system must support a mechanism to provide applications access to all the network interfaces on the system, including those on nodes other than the one on which the application is executing. Existing technology does not provide such a mechanism to support applications access to all the network interfaces on the system.

It is therefore desirable that the operating system ensure that network connectivity is the same for every application regardless of the node upon which an application is running. That is, it is desirable to provide a coherent image of a networking subsystem as seen by applications in a cluster of computers. It is also desirable to extend the network subsystem to provide applications with uniform transparent access to networking services, without any changes to the applications. These goals should be achieved with minimal impact on the existing network subsystem implementation.

SUMMARY OF THE INVENTION

A method and an apparatus for a single image networking subsystem in a clustered system are disclosed. A transparent routing within the clustered system is achieved without changing the networking code on each node of the cluster by using a pair of modules interposed appropriately on the networking stack.

There are four components to create a single system image for networking applications: global management of the network name space, demultiplexing of incoming packets to the appropriate node, multiplexing of outgoing packets from various nodes onto a network device and access to remote network devices (from network stacks). There are other considerations for network services in a multi-computer system: replication of services to provide higher throughput and/or lower response times, management of global state in the network protocols and initialization of the network protocol stacks.

A network as used herein refers to network protocols such as Ethernet or FDDI (Fiber-Distributed Data Interface), and not to the multi-computer backplane. A host as used herein refers to a computer that is accessible via a network. For example, a host refers either to the multi-computer as a whole or to other hosts that communicate with the multi-computer.

A remote device (actual network device) is a device that is physically attached to a node other than the one on which a currently executing program is executing. Given a first process of a first node, a second network device is a remote device for the first node if a logical network device of the first node is a logical instantiation on the first node of the second network device. Thus, the first process communicates with a third node through a logical network device of the first node as though the logical network device was actually the second network device of the first node. Thus, a framework is provided that creates an illusion that the set of actual network interfaces available in the system is local to each node in the system.

Many advantages exist for the present invention. By implementing the present invention in a "clustered" system built out of several computers, the networking subsystem appears to applications as if the applications are running on a single computer. In addition, no modification to the networking code is needed. The present invention is extensible to a variety of networking protocols, not just TCP/IP (Transmission Control Protocol/Internet Protocol) as the packet filter allows the routing within the cluster to be done dynamically. TCP/IP is a set of communication protocols which support peer-to-peer connectivity functions for both local and wide area networks. A packet filter is a program module that can be dynamically programmed to choose (filter) certain types of packets. No modification to the applications is needed (same binaries will work). A packet filter and remote communication between the modules through IDL (Interface Design Language) enable the modules to perform their job. A name server that maintains the port name space is used. The present invention is also flexible in that load balancing may be performed automatically. Further, no changes to applications or to networking codes are necessary.

BRIEF DESCRIPTION OF THE DRAWINGS

The objects, features, and advantages of the method and apparatus of the present invention will be apparent from the following detailed description of the invention in which.

DETAILED DESCRIPTION OF THE INVENTION

A method and an apparatus to provide a single-system image network subsystem in a clustered system is described. In the following description, for purposes of explanation, numerous details are set forth such as specific bit values, message paths, word sizes, etc., in order to provide a thorough understanding of the present invention. It will be apparent, however, to one skilled in the art that such specific details are not essential to the practice of the present invention. In particular, although the present invention will be described within a specific network system, it will be appreciated that the present invention is in no way limited to this particular system. As will be appreciated, the present invention finds application in any clustered system requiring a single-system image network subsystem. In the description which follows, reference will be made to figures in which well known electrical structures and circuits are shown in block diagram form in order not to obscure the present invention unnecessarily.

There are four components to create a single system image for networking applications: global management of the network name space, demultiplexing of incoming packets to the corresponding node, multiplexing of outgoing packets from various nodes onto a network device and access to remote network devices (from network stacks). There are other considerations for network services in a multi-computer system that are also addressed herein: replication of services to provide higher throughput and/or lower response times, management of global state in the network protocols and initialization of the network protocol stacks.

Remote device as used herein refers to a device that is physically attached to a node other than the one on which the currently executing program is executing. A remote node as herein refers to the node to which a remote device is attached. A network as used herein refers to networks such as Ethernet or FDDI (Fiber-Distributed Data Interface), and not to the multi-computer backplane. A host as used herein refers to a computer that is accessible via a network. For example, a host refers either to the multi-computer as a whole or to other hosts that communicate with the multi-computer. Vnode as used herein refers to an object in a file system that represents a file. Multiple vnodes may refer to a single file. Vnodes are typically used to communicate between the upper half of the file system and file system representations.

Figure 1:
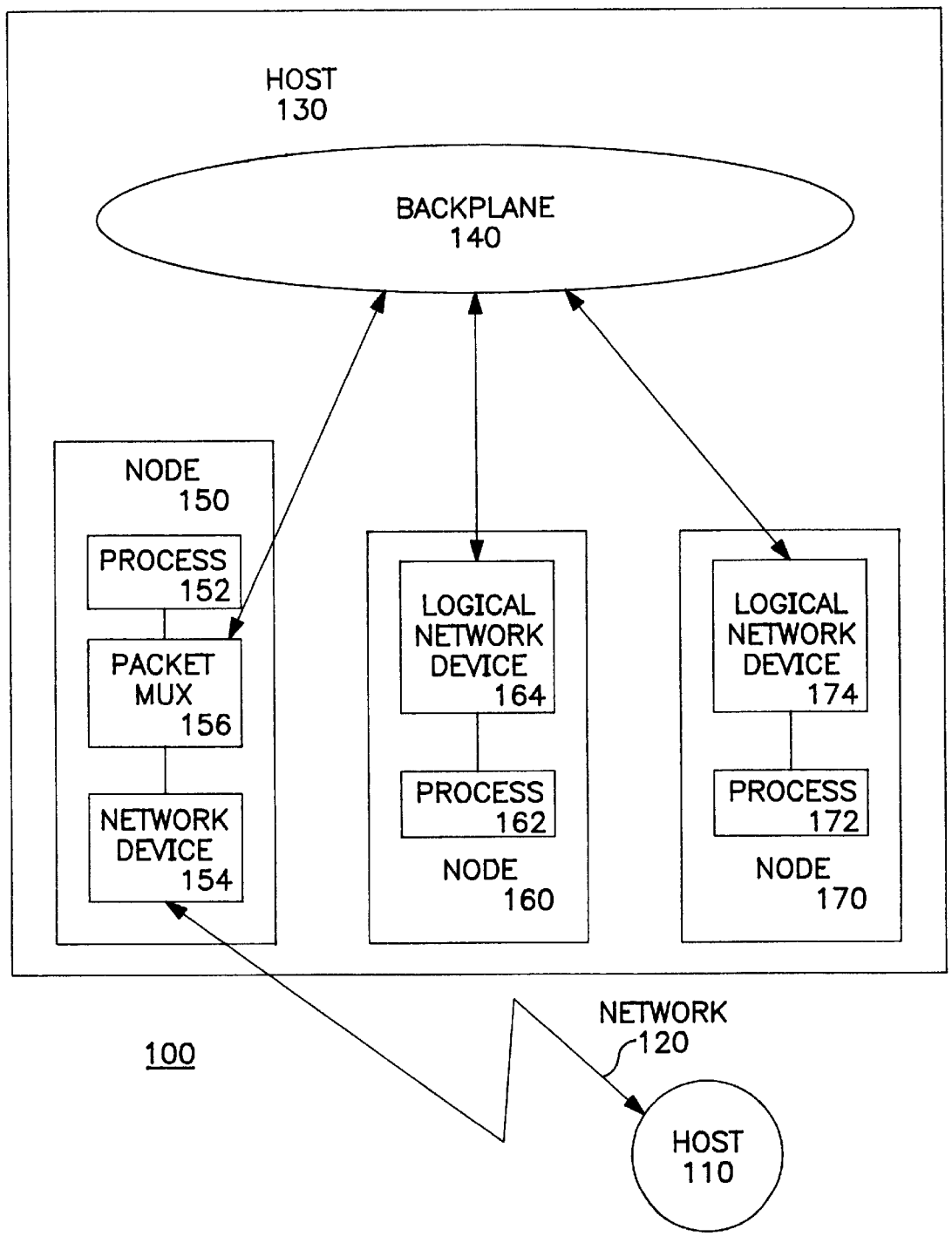
FIG. 1 illustrates a network coupling two hosts wherein a packet multiplexer and two logical network devices are used to provide a single-system image network subsystem within a clustered host system.

FIG. 1 illustrates a single-system image network subsystem within a clustered system. System 100 of FIG. 1 is formed from two hosts, 110 and 130, coupled together by network 120. A host is a computer that is accessible via a network. Host 130 is an example of a multi-computer class of hosts. For one embodiment, host 110 is a single computer. Alternately, host 110 is a multi-computer.

Multi-computer host 130 includes backplane 140 and nodes 150, 160 and 170. Backplane 140 is used to couple together nodes 150, 160 and 170. In contrast to the multi-computer backplane 140, network 120 is a standard network, such as Ethernet or FDDI.

Within host 130, a node is one or more computers operating using a single shared memory. Thus, each node of host 130 can be a single processor computer, a co-processor computer or a multiple computer system. In the case wherein a node is formed from multiple computers, the computers can be of the same type, or the node can be formed from two or more types of computers.

Node 150 includes network device 154 that is used to couple host 130 to host 110 via network 120. Process 152, running upon node 150, communicates with network device 154 through packet multiplexer (pmux) 156. Network device 154 is coupled through packet multiplexer 156 to backplane 140. In turn, backplane 140 is coupled to logical network device 164 of node 160 and to logical network device 174 of node 170. Network device 154, packet multiplexer 156 and logical network devices 164 and 174 together operate to permit host 110 to communicate transparently with processes 152, 162 and 172.

A remote device is a device that is physically attached to a node other than the one on which a currently executing program is executing. With respect to process 162 of node 160, network device 154 is a remote device. This is because logical network device 164 is a logical instantiation on node 160 of network device 154 of node 150. Process 162 of node 160 communicates with host 110 through logical network device 164 as though logical network device 164 was actually network device 154. Logical network device 164 sends communication packets from process 162 to host 110 by way of backplane 140, packet multiplexer 156, network device 154, and then network 120. Host 110, in turn, sends communication packets to process 162 by way of network 120, network device 154, packet multiplexer 156, backplane 140, and then to logical network device 164. Thus, with respect to logical network device 164 of node 160, node 150 is a remote node. This is because node 150 is the node to which remote device 154 is attached.

Similarly, network device 154 is a remote device, with respect to process 172 of node 170. This is because logical network device 174 is a logical instantiation on node 170 of network device 154 of node 150. Process 172 of node 170 communicates with host 110 through logical network device 174 as though logical network device 174 was actually network device 154. Logical network device 174 sends communication packets from process 172 to host 110 by way of backplane 140, packet multiplexer 156, network device 154, and then network 120. Host 110, in turn, sends communication packets to process 172 by way of network 120, network device 154, packet multiplexer 156, backplane 140, and then to logical network device 174. Thus, node 150 is also a remote node with respect to logical network device 174 of node 170. This is because node 150 is the node to which remote device 154 is attached.

In contrast, with respect to process 152 of node 150, network device 154 is a local device. This is because network device 154 is co-located on node 150 with process 152. Process 152 sends communication packets to host 110 by way of packet multiplexer 156, network device 154, and then network 120. Host 110, in turn, sends communication packets to process 152 by way of network 120, network device 154 and then to packet multiplexer 156. Thus, node 150 is a local node with respect to network device 154 of node 150. This is because node 150 is the node to which local device 154 is attached.

Packet multiplexer (pmux) 156 performs a packet multiplexing fan-out function from network device 154 (and host 110) to process 152 of node 150, to process 162 of node 160 and to process 172 of node 170. Packet multiplexer 156 also performs a packet multiplexing fan-in function to network device 154 (and host 110) from process 152 of node 150, from process 162 of node 160 and from process 172 of node 170.

Thus, a framework is provided that creates an illusion that the set of actual network interfaces available in the system is local to each node in the system. Applications are kept unaware of the actual location of each network device, and their view of the network is the same from every node in the system. When an application transmits data over an illusory network device on a node, the framework forwards the outgoing network packet to the real device. Similarly, on the input side, the framework forwards packets from the node on which the real network device resides to the node on which the appropriate application is running.

Figure 2:
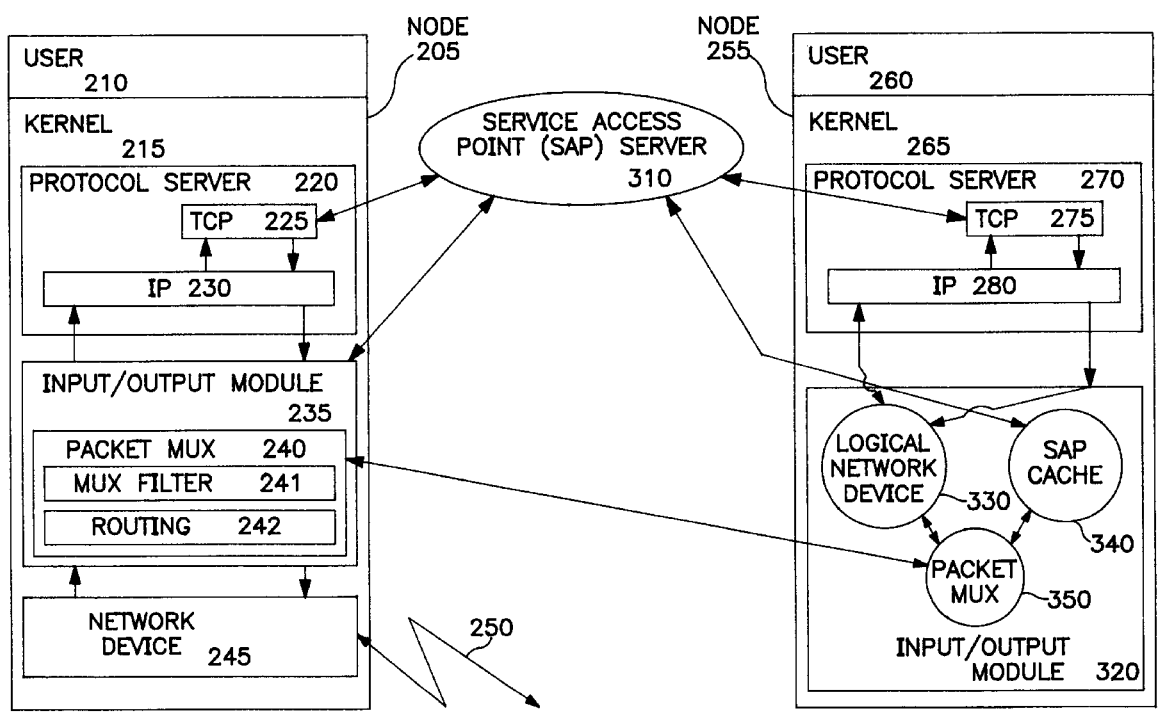
FIG. 2 illustrates a service access point (SAP) server for two nodes of the clustered host system, the first node having a network device and the second node having a logical network device; and, FIGS. 3a–3d illustrate service access point (SAP) caching within a STREAMS module of a node of the clustered host system.

FIG. 2 illustrates an exemplary service access point (SAP) server for two nodes of the clustered host system, the first node having a network device and the second node having a logical network device. The service access point (SAP) server is responsible for the global management of the network name space.

Every network connection is typically labeled by a set of identifiers. A label includes a protocol identifier, a source host identifier, a source service access point, a destination host identifier and a destination service access point. Management of protocol and host identifiers is well understood and does not require special handling in a multi-computer system. Service access point handling in a multi-computer system, however, requires coordination between the various nodes to create a single system image environment for network applications. In the TCP/IP nomenclature, service access points are port numbers. The terms port numbers and service access points are used interchangeably herein. The present invention is equally applicable to service access points in general.

Port numbers are allocated when a network endpoint is created (in the bind call) or when a connection is initiated (in the connect call) or when a connection is accepted (in the accept( ) call). Port numbers may be specified by the network application and may be coupled with a fixed or a wild-card source host identifier at the time of allocation. Usually a wild-card source host identifier is used to create service providers (i.e. daemon programs, such as telnetd or rlogind), that handle incoming requests for services on the local host. The system can choose port numbers for applications that are insensitive to the port number.

In the exemplary embodiment illustrated in FIG. 2, a global service access point (SAP) facility 310 is defined for the allocation and de-allocation of service access points. The facility 310 ensures that the same port number is not allocated by different nodes in the system.

Most network protocol stacks are implemented within the AT&T® STREAMS networking framework. The interfaces for this framework are well known. STREAMS utilizes a layered approach to building network protocol stacks. The present implementation of the present invention calls for the protocol modules to run on the local node and the device driver to run on the remote node. Thus the remote device access supported by the multi-computer system must also allow for remote device access from within STREAMS, i.e. not just at the vnode layer but also within an arbitrary Stream. This requires adhering to STREAMS flow control and other protocols.

A network protocol stack progressively "peels off" layers of protocol headers in order to demultiplex an incoming packet from the network device 245 to a specific protocol family, a specific network protocol, a specific transport protocol, and a specific session. This process is aided by protocol identifiers in the various headers.

In a multi-computer system there is an additional required demultiplexing step. Incoming packets are first processed on the node that has the network adapter physically attached to it. However, the data may be directed to an application running on a different node. The network subsystem has the responsibility of transferring the packet to the specific node of the system on which the application is running. The node number is not included in the packet. Instead, the node number must be determined by examining other information in the packet headers and state information maintained by the host system.

The demultiplexing of incoming packets to nodes is orthogonal to the protocol stack processing in a symmetric design such as the present invention where all services are available on all nodes. Thus, there is the flexibility to demultiplex on node number at the most appropriate point in the network protocol stack, i.e. either at the device driver level or the network protocol layer, the transport protocol layer, the session layer, or higher.

In the preferred embodiment, the demultiplexing is implemented at the lowest layer of the protocol stack, at the device driver. A programmable packet filter 241 is used to extract relevant information from the packet and the information is used to lookup the destination node within the multi-computer system. A routing function 242 enables the routing of the packet to its destination node. This implementation has the following advantages: protocol processing is not limited to those nodes that have network devices, only one new module is written to handle multi-computer networking for most protocol stacks and only minimal changes to the protocol stack are required.

The preferred embodiment of the system of the present invention uses a uniform model for all protocols. All protocol processing for outgoing packets is performed on the node on which the vnode for the network connection exists. The layer that passes data to the device driver makes use of remote device access (transparently) to send data over the physical medium. This structuring implies the processing set-up shown in FIG. 2. The input/output module 320 in FIG. 2 creates the illusion of a local lower stream corresponding to a remote physical network device in the system. The input/output module 320 is pushed above the cloneable network device driver by network configuration utilities. Thus, the network stack, with the exception of the input/output module 320 is oblivious of the location of the network device within the multi-computer system.

The network protocol modules including TCP 225 and 275 and IP 230 and 280 are implemented as STREAMS cloneable drivers/multiplexers. The design of the present invention requires that the network endpoint, e.g., /dev/tcp for TCP, be opened on the node on which the open system call is invoked. This handling of the open call is different from typical devices where the device driver for a specific device runs on the node to which the physical device is attached.

The model for network services is to have a server listen for service requests. After authentication, the server sets up a process to handle the service request. In large systems such as for example a system for Solaris MC (Multi-Computer) which is an experimental multi-computer operating system, a single server for a type of service can become a bottleneck. Hence it is desirable that the servers be replicated on various nodes in the system. Replication of services may require extensions to the networking API (Application Programming Interface), mainly in the area of establishing connections. In the typical case, only one process is permitted to register itself as a listener on a specific port number. API extensions allows multiple processes to register themselves as listeners on a specific port number. This facility is disabled by default, and enabled on a per-port basis by issuing a privileged command. All services that must be replicated must be modified to request the new semantics.

In FIG. 2, network device 245 of node 205 is an instance of a cloneable device driver attached to node 205 while logical network device 330 of node 255 represents an instance of the cloneable device driver functioning as a proxy for the remote device 245. Input/output module 235 of node 205 (and 320 for node 255) is a STREAMS based module that is composed of a logical network device object (lnd), and uses a packet multiplexer-demultiplexer object referred herein as packet multiplexer (pmux) 240 (and 350 for node 255). The lnd enables the linking of network device driver STREAMS on different nodes.

A pmux is associated with each physical network device in the system and receives in-bound packets from the network device and demultiplexes them to lnds. A pmux also accepts out-bound packets from lnds and transmits them on the network via the network device it is associated with. Thus, input/output module 235 creates the illusion of a local lower stream corresponding to a physical network device on a remote node. The description accompanying FIG. 3 describes the interfaces of the lnd and pmux objects and describes lnd 330, pmux 240, SAPServer 310 in more detail. Node 205 also includes protocol server 220, TCP 225, IP 230, user 210 and kernel 215. Node 255 also includes protocol server 270, TCP 275, IP 280, user 260 and kernel 265. The system also includes SAPServer 310, a module that tracks the relationship between service access points and nodes within the multi-computer. In FIG. 2, SAPServer 310 is shown independent of a node for clarity. In reality it would be provided on one or more of the nodes of the system.

Figure 3A:
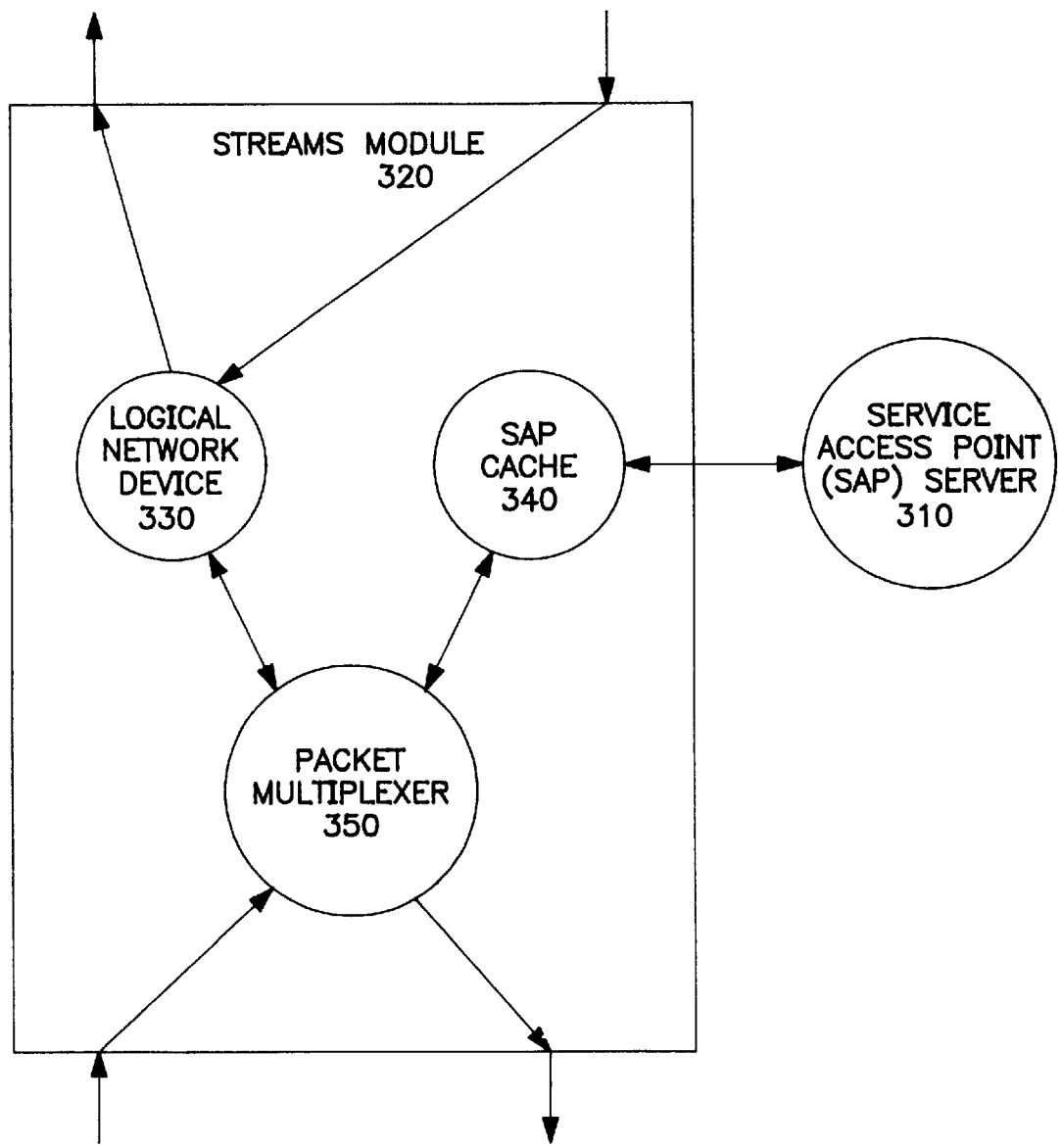

FIG. 3a illustrates service access point (SAP) caching within a STREAMS module of a node of the clustered host system. The interfaces required for the components that make up the networking subsystem and their interactions are listed below. There are four interfaces: logical network device (lnd) 330, packet multiplexer (pmux) 350, service access point cache (sap_cache) 340 and service access point server (sap server) 310. STREAMS based module 320 (referred herein as an input/output module or mc_net) implements an lnd and uses a pmux object. When STREAMS module 320 is configured with a physical network device, it also implements a pmux and a sap cache object. When STREAMS module 320 is configured with a proxy network device, a pmux object is associated with the corresponding physical network device. In the latter case, the pmux is on a remote machine. In FIG. 3a lnd 330, pmux 350 and sap cache 340 are all shown encapsulated in one STREAMS module 320. The mapping from pmux 350 to lnd 330 is one-to-many.

Logical network device (lnd) 330 is the proxy for a network device of a multi-computer system. The network device may be on the same node or on a different node from the node on which the logical network device is created. Logical network device 330 is inserted into a STREAMS based network protocol stack between the network layer module and the real network device driver which is cloneable. By requiring that the real network device driver be cloneable, it is ensured that the driver can be available on a node even when the physical device is not attached to that node. Logical network device 330 therefore represents two interfaces. One conforms to the STREAMS framework and interprets all messages exchanged between the network layer and the network driver. The second interface, interacts with packet multiplexers (pmux).

Each logical network device 330 attaches itself to a packet multiplexer. Logical network device 330 is responsible for receiving incoming packets from a server packet multiplexer and passing them upstream to the network protocol via the STREAMS interface. Logical network device 330 is also responsible for applying filters on outgoing packets to determine if the packet is destined for a port on some node of the local host. If so, logical network device 330 marks the packet as an incoming packet and passes it to the appropriate logical network device 330 on the system. If the outgoing packet is destined for a remote host, logical network device 330 marks the packet as an outgoing packet and passes the packet to the packet multiplexer for that network device. Incoming as used herein refers to data entering the host from a network device. Outgoing as used herein refers to data leaving the host through a network device. In certain cases outgoing data at one logical network device may turn into incoming data at the same or at another network device.

Packet multiplexer (pmux) 350 acts as a server for a network device accessed from nodes other than the node on which the network device is attached. Thus, server packet multiplexer 350 has a physical network device associated with it. Packet multiplexer 350 is responsible for applying a series of filters on each incoming packet to extract the source and destination SAPs. The first filter that results in a non-NULL SAP is used. It then queries SAP Server 310 to determine which logical network device to forward the incoming packet to. Once a mapping between a SAP and a logical network device is known, a new filter is added to packet multiplexer 350 such that given a packet, the filter returns packet multiplexer 350 on the node to forward the packet to. Packet multiplexer 350 also provides the means for logical network devices to send outgoing data packets through the physical network device associated with the multiplexer.

SAP Cache (sap_cache) 340 is a cache for mappings from Service Access Points (SAPs) to Logical Network Devices (lnds). SAP Cache 340 has SAPServer 310 associated with it which provides mappings from SAPs to nodes. SAP Cache 340 maintains a mapping from nodes to lnds 330. SAP Cache 340 may also be directly populated with mappings from SAPs to lnds 330.

Service Access Point Server (SAPServer) 310 is responsible for the global management of the network name space. The design of server 310 allows for support of multiple network families. Multiple servers 310 may co-exist on a single multi-computer system.

Figure 3B:
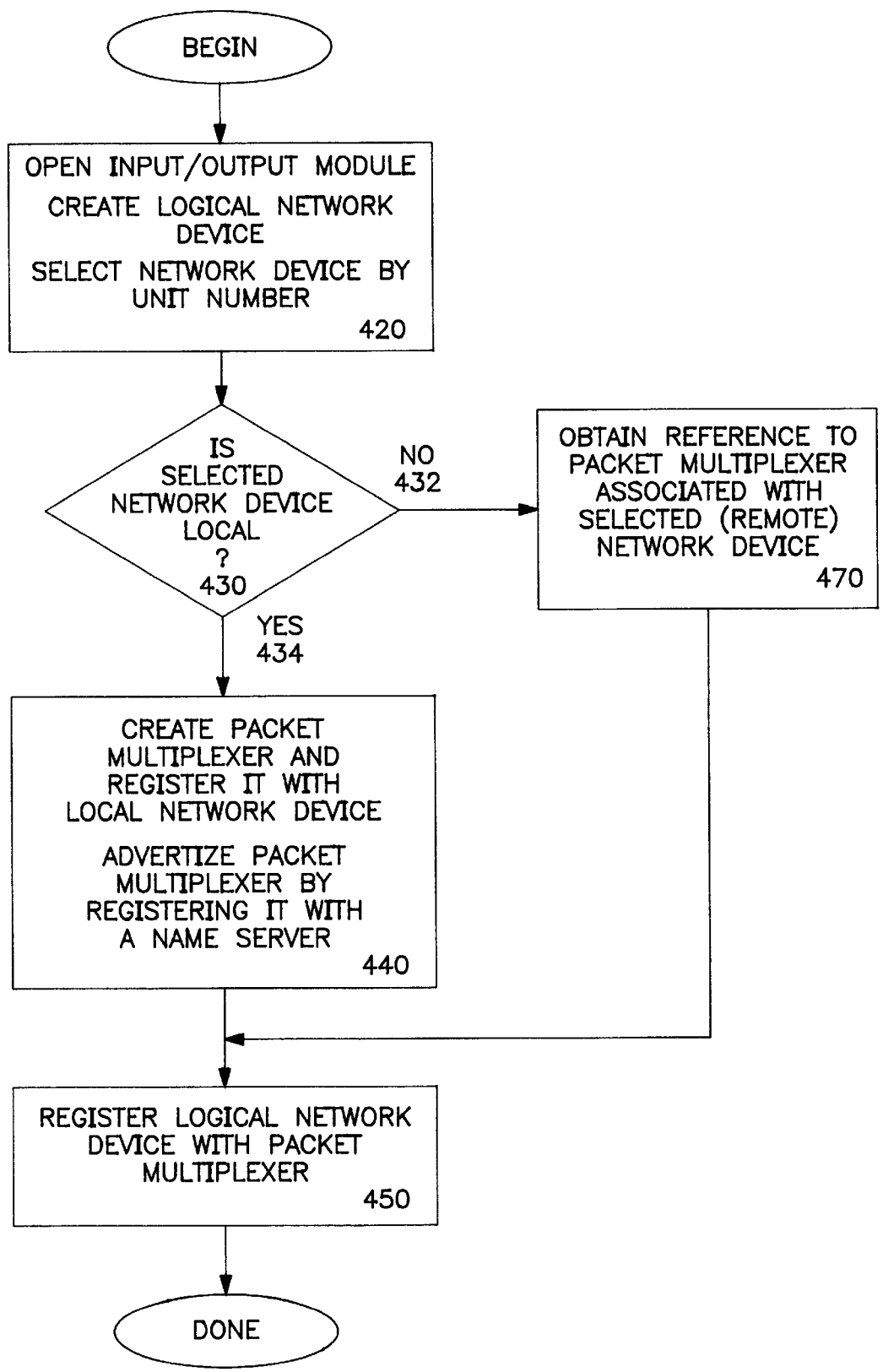

FIG. 3b illustrates initialization for an input/output module of a clustered host system node. In step 420, the input/output module is first opened and a logical network device is created. The network device then is selected by unit number. If the selected network device is local, then in step 440, a pmux is created and registered with the local network device. The pmux is also advertised by being registered with a name server. The logical network device is then registered with the pmux in step 450. If the selected network device is not local, then in step 470, a reference to a pmux associated with the selected remote network device is obtained. The logical network device is then registered with the pmux in step 450.

Figure 3C:
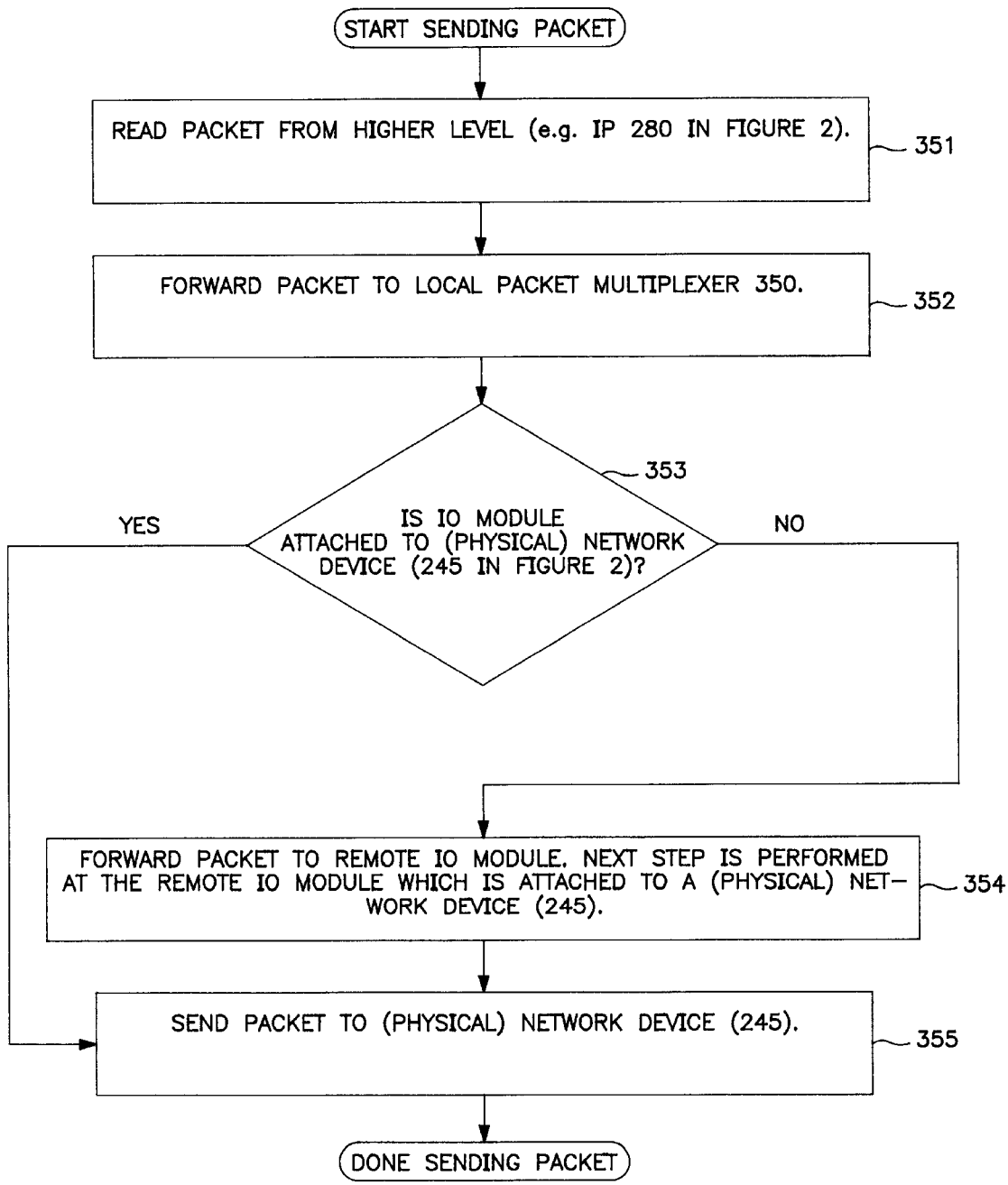
Figure 3D:
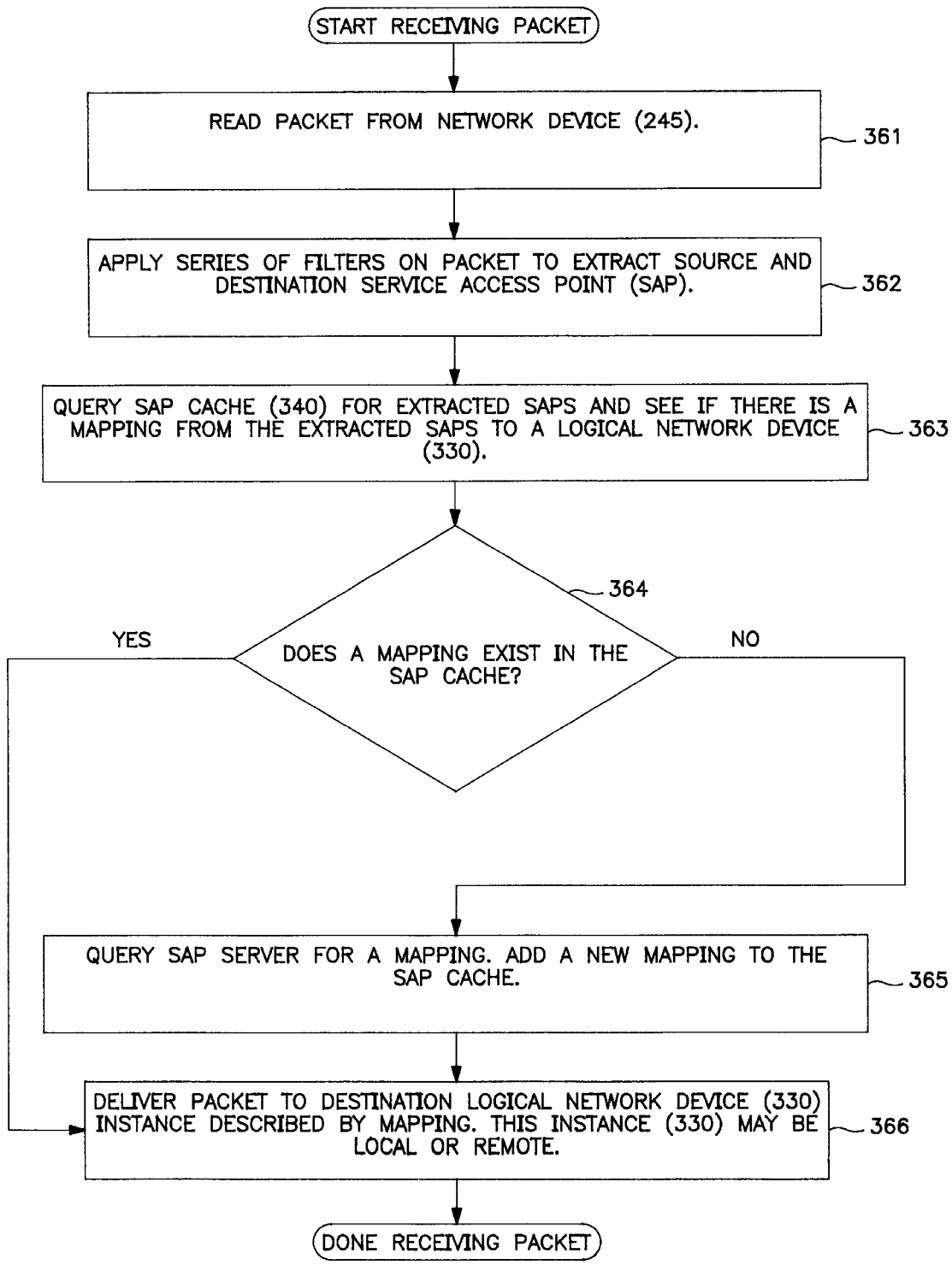

FIG. 3c and 3d are flow diagrams illustrating the general steps followed when sending and receiving a packet. When sending a packet, in step 351, a packet is read from a higher network layer level such as from IP 280. In step 352, the packet is then forwarded to local packet multiplexer 350. In step 353, if the input/output module is attached to (physical) network device 245, then in step 355, the packet is sent to (physical) network device 245. If in step 353, an input/output module is not attached to (physical) network device 245, then in step 354, the packet is forwarded to remote input/output module. The packet is then processed at the remote input/output module attached to a (physical) network device 245. In step 355, the packet is sent to (physical) network device 245.

When receiving a packet, in step 361, a packet is read from network device 245. In step 362, a series of filters are applied on the packet to extract the source and destination service access point (SAP). In step 363, SAP cache 340 is queried to find the extracted SAPs and to see whether there is a mapping from the extracted SAPs to a logical network device 330. In step 364, if a mapping exists in SAP cache 340, then in step 366, the packet is delivered to the destination logical network device 330 instance described by the mapping. This instance 330 may be local or remote. If there is no mapping in the SAP cache 340, then in step 365, SAP server 310 is queried for a mapping. A new mapping is added to SAP cache 340. In step 366, the packet is delivered to the destination logical network device 330 instance described by the mapping.

Although the present invention has been particularly described with reference to FIGS. 1 through 3d, it should be understood that these figures are for illustration only and should not be taken as limitations upon the invention. It is further contemplated that many changes and modifications may be made to the invention, by one of ordinary skill in the art, without departing from the spirit and scope of the invention as disclosed herein.

What is claimed is:

1. A method for maintaining coherency in a network subsystem in a clustered system with a plurality of nodes, at least a first node having an actual network device, said method comprising the steps of:

simulating the actual network device of the first node to generate a logical network device for a second node in said clustered system, said second node lacking an actual network device of its own; and using said logical network device of said first node to allow communication between said first node and a third node.

2. The method of claim 1 wherein said step of using further comprises the step of opening an input/output module having a logical network device object enabling linking of said actual network device of said first node to said logical network device of said second node.

3. The method of claim 2 further comprises the step of obtaining a reference to a packet multiplexer associated with a selected said actual network device, said packet multiplexer associated with each said actual network device in said system and receives in-bound packets from said actual network device and demultiplexes said in-bound packets into said logical network device object, said packet multiplexer also accepts out-bound packets from said logical network device object and transmits said outbound packets on said actual network through said network device said packet multiplexer is associated with.

4. The method of claim 3 further comprising the step of creating a packet multiplexer and registering said packet multiplexer with said logical network device.

5. The method of claim 4 further comprising the step of advertising said packet multiplexer by registering said packet multiplexer with a name server which maintains network port name space.

6. The method of claim 5 further comprising the step of registering said logical network device with said packet multiplexer.

7. An apparatus for maintaining coherency in a network subsystem in a clustered system with a plurality of nodes comprising:

a first node in said clustered system having an actual network device; and a second node coupled to said first node, said second node lacking an actual network device of its own and having a logical network device generated by simulating said actual network device of said first node, said second node communicating with other nodes in said clustered system through said logical network device.

8. The apparatus of claim 7 wherein said second node comprises an input/output module stored in a storage element of said node, said input/output module having a local network device object enabling linking of said actual network device of said first node with said logical network device of said second node.

9. The apparatus of claim 8 wherein said input/output module comprises of a packet multiplexer, said packet multiplexer associated with each said actual network device in said system and receives in-bound packets from said actual network device and demultiplexes said in-bound packets into said logical network device objects, said packet multiplexer also accepts out-bound packets from said logical network device objects and transmits said out-bound packets on said network through said actual network device said packet multiplexer is associated with.

10. The apparatus of claim 9 wherein said packet multiplexer comprises a packet filter for selecting network packets.

11. The apparatus of claim 10 wherein said packet multiplexer comprises a routing function coupled to said packet filter for allowing remote communication.

12. A coherent network subsystem in a clustered system with a plurality of nodes comprising:

a first node in said clustered system having an actual network device; and a second node coupled to said first node, said second node lacking an actual network device of its own and having a logical network device generated by simulating said actual network device of said first node, said second node communicating with other nodes in said clustered system through said logical network device.

13. The system of claim 12 wherein said second node comprises an input/output module stored in a storage element of said node, said input/output module having a local network device object enabling linking of said actual network device of said first node with said logical network device of said second node.

14. The system of claim 13 wherein said input/output module comprises of a packet multiplexer, said packet multiplexer associated with each said actual network device in said system and receives in-bound packets from said actual network device and demultiplexes said in-bound packets into said logical network device objects, said packet multiplexer also accepts out-bound packets from said logical network device objects and transmits said out-bound packets on said network through said actual network device said packet multiplexer is associated with.

15. The system of claim 14 wherein said packet multiplexer comprises a packet filter for selecting network packets.

16. The system of claim 15 wherein said packet multiplexer comprises a routing function coupled to said packet filter for allowing remote communication.

* * * * *